(12) United States Patent
Bakke et al.

(10) Patent No.: US 8,302,932 B2
(45) Date of Patent: Nov. 6, 2012

(54) SPRINKLER VALVE TEST AND CONTROL DEVICE AND METHOD THEREOF

(76) Inventors: John Sam Bakke, County of Meagher, MT (US); David Bakke, County of Meagher, MT (US)

(*) Notice: Subject to any disclaimer, the term of this patent is extended or adjusted under 35 U.S.C. 154(b) by 739 days.

(21) Appl. No.: 12/380,999

(22) Filed: Mar. 7, 2009

(65) Prior Publication Data

US 2010/0224810 A1 Sep. 9, 2010

(51) Int. Cl.
*F16K 31/08* (2006.01)
(52) U.S. Cl. .................................. 251/65; 251/129.17
(58) Field of Classification Search .................. 251/65, 251/129.15, 129.17
See application file for complete search history.

(56) References Cited

U.S. PATENT DOCUMENTS

| | | | | |
|---|---|---|---|---|
| 3,212,751 A * | 10/1965 | Hassa | | 251/65 |
| 3,587,016 A * | 6/1971 | Coakley | | 335/237 |
| 4,025,885 A * | 5/1977 | Giannini | | 335/154 |
| 4,056,255 A * | 11/1977 | Lace | | 251/129.15 |
| 4,067,541 A * | 1/1978 | Hunter | | 251/129.15 |
| 6,044,865 A * | 4/2000 | Kreitmayr et al. | | 137/607 |
| 6,076,550 A * | 6/2000 | Hiraishi et al. | | 137/550 |
| 6,352,238 B1 * | 3/2002 | Roman | | 251/65 |
| 7,032,257 B2 * | 4/2006 | Chen | | 4/406 |
| 8,100,598 B2 * | 1/2012 | Killion et al. | | 401/100 |

* cited by examiner

*Primary Examiner* — John K Fristoe, Jr.
*Assistant Examiner* — Marina Tietjen
(74) *Attorney, Agent, or Firm* — Howard C. Miskin; Gloria Tsui-Yip

(57) ABSTRACT

A sprinkler valve test and control device that is used to test and control a sprinkler valve having a solenoid plunger without the need for electricity. The sprinkler valve test and control device includes a cup shaped yoke body having a cavity and an opening, a magnet positioned in the cavity, and the magnetic having a magnetic field directed towards the opening of the cavity, and an epoxy fill sealing and securing the magnet in the cavity. When the device is placed over a solenoid plunger, the magnetic field actuates the solenoid plunger of the sprinkler valve to turn the sprinkler valve on. The device allows efficient and effective determination of the reasons for the malfunctioning of sprinkler valves.

14 Claims, 3 Drawing Sheets

SPRINKLER VALVE TEST AND CONTROL DEVICE AND METHOD THEREOF

FIELD OF THE INVENTION

The invention relates to a valve test and control device and use thereof. Specifically, a device for testing and controlling an electrical sprinkler valve without the need for electricity that allows efficient and effective determination of the reason for the malfunctioning of the sprinkler valve or the irrigation system. The device will determine upon application whether the valve solenoid plunger is operating properly.

BACKGROUND OF THE INVENTION

An irrigation system comprises a network of irrigation or sprinkler valves interconnected to a master control or timer via electrical wires. The entire irrigation system, except for the master control or timer, is buried or housed underground. When the irrigation system is malfunctioning, each component of the system requires checking and testing to determine the reason for the malfunctioning for further repair.

A sprinkler valve typically has a solenoid that is electrically controlled to actuate a plunger to allow or disallow the displacement of water at the valve diaphragm cavity. In order to test whether a sprinkler valve is working properly, the electrical wires connected to the valve are typically cut, stripped, and connected temporarily to a multimeter or an alternate power source for testing. If the sprinkler valve tests indicate the valve functions properly, then the source of the malfunction is beyond the sprinkler valve. However, if the sprinkler valve is not working properly with the alternate power source, then it is inconclusive whether the problem lies with the electrical wiring, solenoid, the plunger or the diaphragm. The sprinkler valve would have to be completely disassembled to determine the reason for the malfunction.

The prior art testing of the sprinkler valve and the irrigation system is a time consuming process via a process of elimination that requires disassembly of the sprinkler valve or the electrical connections to the solenoid.

Therefore, there is a need for a device that facilitates the testing and control of a sprinkler valve and to allow efficient and effective testing of the sprinkler valve in an irrigation system without the need to disassemble the valve or the need to disconnect the wiring.

SUMMARY OF THE INVENTION

The present invention is a device for the testing and controlling of a sprinkler valve without the need to remove or disassemble it from the irrigation system to facilitate determination of the source of malfunctioning of a sprinkler valve or irrigation system.

The device of the present invention utilizes a high energy magnet to externally actuate the plunger in the solenoid of a sprinkler valve without the need for electricity to test the functionality of the plunger and diaphragm.

The device comprises a cup shaped steel yoke with a magnet positioned and sealed therein with an epoxy fill. A handle on the top of the cup is provided to facilitate maneuvering of the device over the sprinkler valve. The magnet may be substantially cylindrical in shape with an end that concentrates the magnetic field towards the solenoid while the top handle facilitates detachment from the solenoid.

The sprinkler valve testing and controlling device of the present invention can be used to efficiently and effectively determine the reason for the malfunctioning of the sprinkler valve or the irrigation system. The device can also be used to operate a sprinkler valve that is not malfunctioning. This allows remote watering without the use of AC or DC voltage.

BRIEF DESCRIPTION OF THE DRAWINGS

Preferred embodiments of the present invention have been chosen for purposes of illustration and description and are shown (not to scale) in the accompanying drawings forming a part of the specification wherein.

DETAILED DESCRIPTION OF THE PREFERRED EMBODIMENTS

Figure 1:
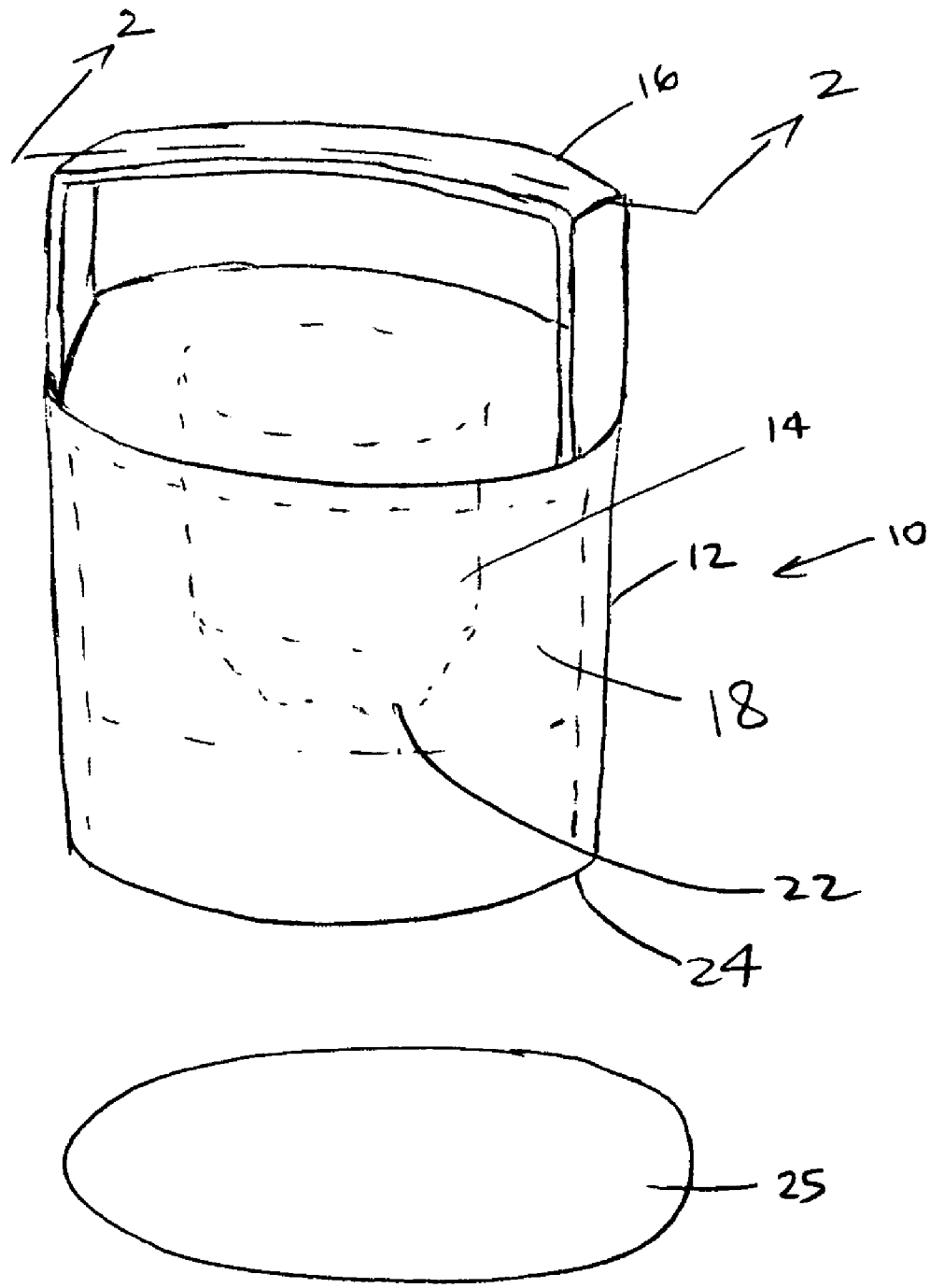
FIG. 1 shows a perspective view of the device of the present invention.
Figure 2:
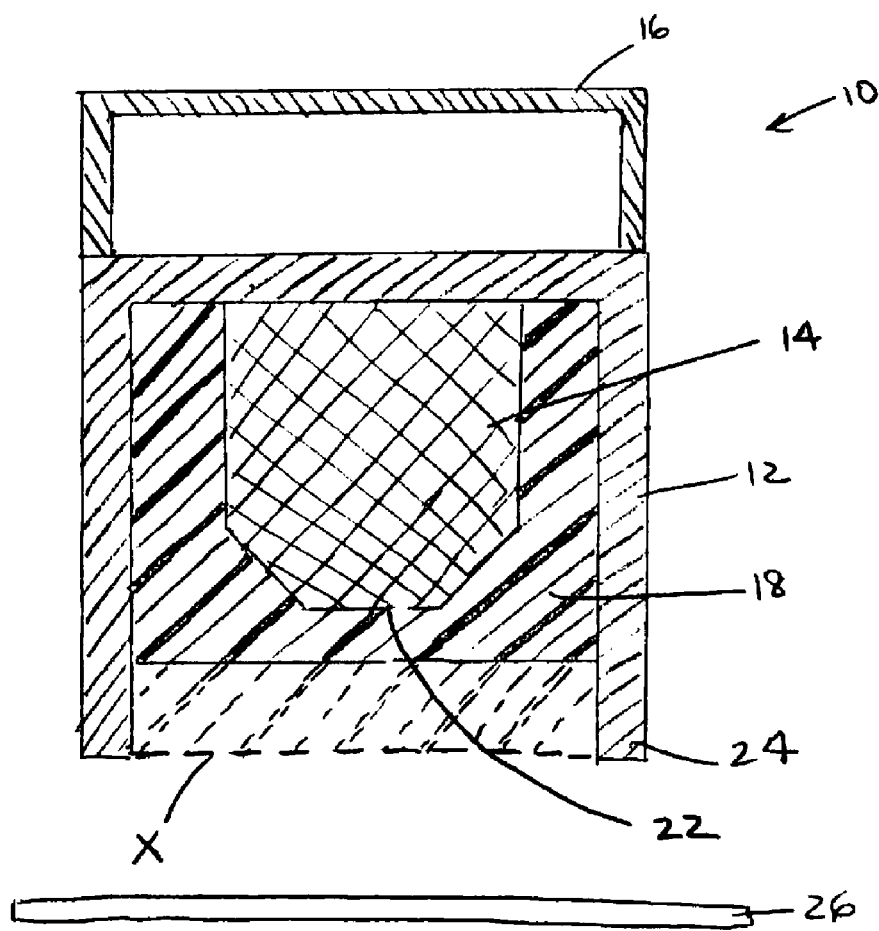
FIG. 2 is a cross-sectional view of the device of the present invention taken along line 2-2 in FIG. 1.

With reference to the drawing wherein the same reference number illustrates the same element throughout, FIGS. 1, 2, and 3 show the sprinkler valve test and control device 10 of the present invention.

Sprinkler valve test and control device 10 has a cup shaped steel yoke body 12, with a high energy magnet 14 positioned and sealed in the cavity of the body 12. The body can take of any shape. On the top end of the body 12 is a handle 16 that facilitates maneuvering the device 10. The high-energy magnet 14 may be a neodymium magnet made from a combination of neodymium, iron and boron. The magnet 14 has a generally cylindrical shape that concentrates the magnetic field at end 22. However, any shape of magnet 14 can be used. The high-energy magnet 14 is sealed in the cavity of the body 12 with an epoxy fill 18. The epoxy fill 18 not only secures the magnet 14 within the body 12, it also prevents direct contact with the magnet 14 and small magnetizable pieces from getting into the device 10. The epoxy fill 18 partially filled the cavity of the body 12 such that the rim 24 of the cup can engage the solenoid of the sprinkler valve (see FIG. 2). In an alternate embodiment, the epoxy fill 18 can completely filled the cavity of the body 12 (as shown by the dashed line X in FIG. 2). The body 12 is made of steel to prevent the magnetic field from escaping from the cavity and causing possible damage. A plate 25 made out of the same steel material as the body 12 may be provided to cover the base of device 10 until the device 10 is ready to use.

Figure 3A:
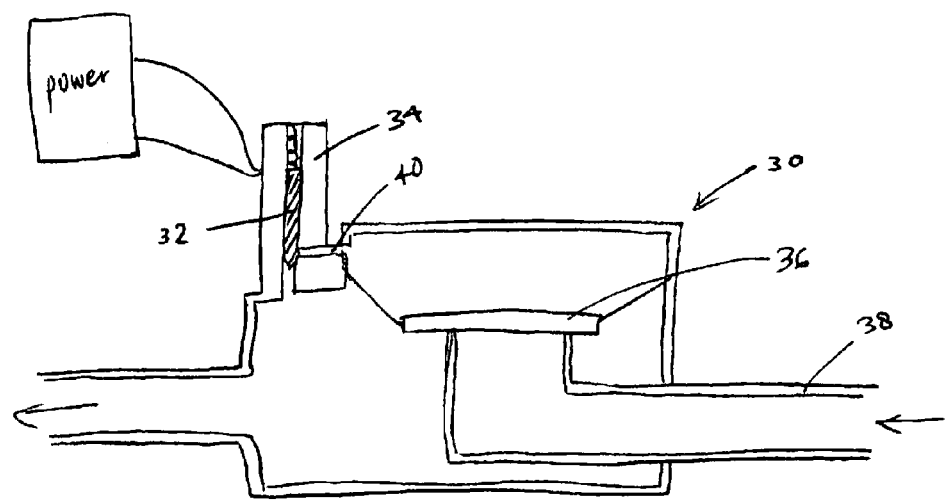
FIGS. 3A and 3B show a sprinkler valve and the use of the device of the present invention to actuate the plunger in the solenoid.
Figure 3B:
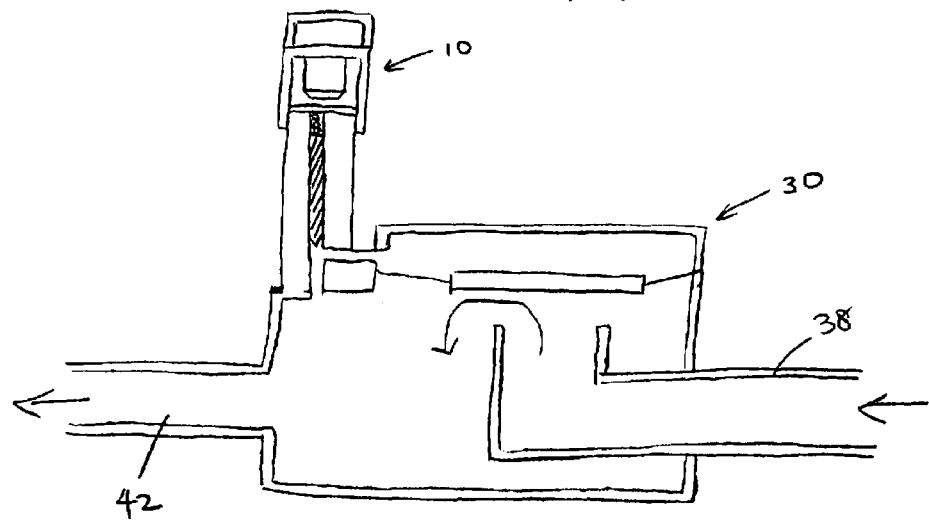

FIGS. 3A and 3B illustrates the use of the device 10 to actuate the plunger 32 in a solenoid 34 of a sprinkler valve 30. FIG. 3A shows a typical sprinkler valve 30 in the closed/off position. In the closed position, the diaphragm 36 is sealed against the inlet pipe 38 by the stronger water force acting against the upper surface of the diaphragm 36 in comparison with the weaker water force acting against the lower surface of the diaphragm 36. The stronger force acting against the upper surface of the diaphragm 36 is maintained by the plunger 32 in the solenoid 34 that keeps a small conduit 40 sealed off.

To turn the valve 30 to the open/on position (see FIG. 3B), the plunger 32 may be actuated by sending an electric current to the solenoid 34, which generates a magnetic field to raise the plunger 32 away from the small conduit 40. The valve 30 may also be opened manually by opening a manual bleed valve (if available on the valve 30), rotating the solenoid 34 partially, or lifting a cam lever under the solenoid plunger 32 (not shown). These methods work fine under ideal conditions, but most times the manual bleed nuts or valves are broken or worn out, or more often, the valves are covered up with mud or debris up to the top of the valve 30 or solenoid 34 housing. Further, not all existing valves 30 have a manual bleed.

Alternatively, the present invention, device 10, can open the valve 30 regardless of a broken or worn manual bleed or whether or not the manual bleed valve is covered. The device 10 of the present invention can actuate the plunger 32 without the need of electricity. Device 10 may be placed directly over the solenoid 34. The concentrated magnetic field of the high-energy magnet 14 is directed directly at the plunger 32 to efficiently and effectively raise the plunger 32. Upon raising the plunger 32, water flows through the small conduit 40 and decreases the water force acting against the upper surface of the diaphragm 36 such that the diaphragm 36 is raised and allows water to flow from the inlet pipe 38 towards the outlet pipe 42. As shown in FIG. 3B, the rim 24 of the device 10 is sized to fit over the solenoid 34 of the sprinkler valve 30. The rim 24 provides a secure and safe positioning of the device 10 over the solenoid 34 and minimizes potential pinching of the user between the magnet 14 and other magnetizable objects. However, the rim 24 is not necessary for the device 10 to properly function. The end 22 of the magnet 14 has a truncated cone shape (or other tapered shape) that concentrates the magnetic field towards the plunger 32, and also facilitates detachment of the device from the solenoid 34.

To disengage the device 10 from the valve 30, a user can use force greater than the magnetic force to manually disengage the device from the valve 30. Alternately, to facilitate removal of the device 10, a non-magnetic material 26 (shown in FIG. 2) can be slid between the bottom of the device 10 and the valve 30 to provide an air gap separation.

The ability to safely manipulate the plunger 32 in the solenoid 34 of a valve 30 without electricity provides an effective and efficient method of determining the reason for the malfunctioning of a valve 30. This allows pretesting of the valve 30 so that electrical and plumbing problems can be separated from valve problems. It also allows selective operation of a particular valve 30 in the entire system for remote watering without the use of AC or DC voltage.

The features of the invention illustrated and described herein is the preferred embodiment. Therefore, it is understood that the appended claims are intended to cover the variations disclosed and unforeseeable embodiments with insubstantial differences that are within the spirit of the claims.

We claim:

1. A portable device for testing or controlling a sprinkler valve having a solenoid plunger comprises:
    a cup shaped yoke body having a cavity and an opening defining a rim for engaging the solenoid plunger of the sprinkler valve;
    a magnet positioned within said cavity, said magnet having a magnetic field directed towards said opening of said cavity; and
    an epoxy fill sealing and securing said magnet in said cavity, said epoxy fill at least partially fills said cavity of said body;
    wherein said device having no moving parts and no electrical components and placing said device over a solenoid plunger with said magnetic field directed towards the solenoid plunger actuates the solenoid plunger of the sprinkler valve to turn the sprinkler valve on without said device nor the solenoid plunger being electrically energized.

2. The device of claim 1, wherein said body is made of steel to prevent said magnetic field from escaping from said cavity except from said opening, thereby directing said magnetic field towards said opening.

3. The device of claim 1 wherein said body further having a handle to facilitate maneuvering of said device over the sprinkler valve.

4. The device of claim 1 wherein said body has a substantially cylindrical shape.

5. The device of claim 1 wherein said magnet has a substantially cylindrical shape.

6. The device of claim 1 wherein said magnet further having one end with a concentrated magnetic field directed towards said opening of said cavity.

7. The device of claim 6 wherein said one end of said magnet having a truncated cone shape directed towards said opening of said cavity.

8. The device of claim 1 wherein said magnet is made from a combination of neodymium, iron and boron.

9. The device of claim 1 wherein said epoxy fill completely fills said cavity of said body up to said opening.

10. The device of claim 1 further comprising a cover for covering said opening of said body until the device is ready for use.

11. The device of claim 10 wherein said cover is made of steel.

12. A method of testing or controlling a sprinkler valve having a solenoid plunger comprising the steps of:
    providing a cup shaped yoke body having a cavity and an opening with no moving parts and no electrical components;
    providing a magnet positioned within said cavity, said magnet having a magnetic field directed towards said opening of said cavity;
    providing an epoxy fill sealing and fixedly securing said magnet in said cavity;
    placing said opening of said body over the solenoid plunger of the sprinkler valve;
    actuating the solenoid plunger with said magnet field of said magnet, thereby turning the sprinkler valve on without said solenoid plunger being electrically energized;
    wherein said epoxy fill prevents direct contact between said magnet and said solenoid plunger and prevents small magnetizable pieces from getting into said cup shape yoke body.

13. The method of claim 12 wherein said opening of said cavity defining a rim, further comprising the step of:
    engaging said rim over said solenoid plunger of said sprinkler valve.

14. The method of claim 12 further comprising the steps of:
    providing a non-magnetizable element;
    sliding said non-magnetizable element between said opening of said body and said solenoid plunger of said sprinkler valve to create an air gap separation to facilitate removal of said body from said solenoid plunger.

* * * * *